United States Patent [19]
Alig et al.

[11] Patent Number: 5,846,509
[45] Date of Patent: Dec. 8, 1998

[54] METHOD OF PRODUCING VAPOR GROWN CARBON FIBERS USING COAL

[75] Inventors: Robert L. Alig, Dayton; David J. Burton, Fairborn, both of Ohio

[73] Assignee: Applied Sciences, Inc., Cedarville, Ohio

[21] Appl. No.: 526,169

[22] Filed: Sep. 11, 1995

[51] Int. Cl.$^6$ ........................................................ D01F 9/12
[52] U.S. Cl. .......................................................... 423/447.3
[58] Field of Search ............................ 423/447.3, 445 B; 427/249

[56] References Cited

U.S. PATENT DOCUMENTS

| | | | |
|---|---|---|---|
| 2,375,796 | 5/1945 | Krejci | 423/447.3 |
| 2,796,331 | 6/1957 | Kauffman et al. | 423/447.3 |
| 4,306,885 | 12/1981 | Kober et al. | 423/215.5 |
| 5,024,818 | 6/1991 | Tibbetts et al. | 423/447.3 |
| 5,374,415 | 12/1994 | Alig et al. | 423/447.3 |

OTHER PUBLICATIONS

Renganathan et al, "Preparation of Ultra–Low Ash Coal Extract Under Mild Conditions", *Fuel Processing Technology*, 18 (1988) pp. 273–278. no month.

Tibbetts et al, "Effect of Sulfur on the Production of Carbon Fibers in the Vapor Phase", American Carbon Society, Buffalo, NY, Jun. 13, 1993.

Clausen et al, "Synthesis and Properties of Millimeter Wave Screening Materials from JP–8 Fuel", Smoke Obscurants Symposium XVIII, Aug. 23–26, 1994.

*Primary Examiner*—Michael Lewis
*Assistant Examiner*—Stuart L. Hendrickson
*Attorney, Agent, or Firm*—Killworth, Gottman, Hagan & Schaeff, L.L.P.

[57] ABSTRACT

A method of producing vapor grown carbon fibers is provided in which coal is utilized as a source of an iron catalyst, as a source of hydrocarbon and sulfur, or both. The method includes the steps of introducing pulverized coal into a furnace containing a gas selected from the group consisting of hydrogen, hydrocarbon, nitrogen, ammonia, helium, or mixtures thereof, and maintaining the gas at a temperature from about 1000°–1175° C. to form the fibers. The coal has a sulfur content of from 1 to 6% by weight and may comprise high volatile bituminous coal. The use of coal to produce vapor grown carbon fibers provides a significant cost advantage over other starting materials and also provides an environmentally safe use for high sulfur content coal.

15 Claims, 2 Drawing Sheets

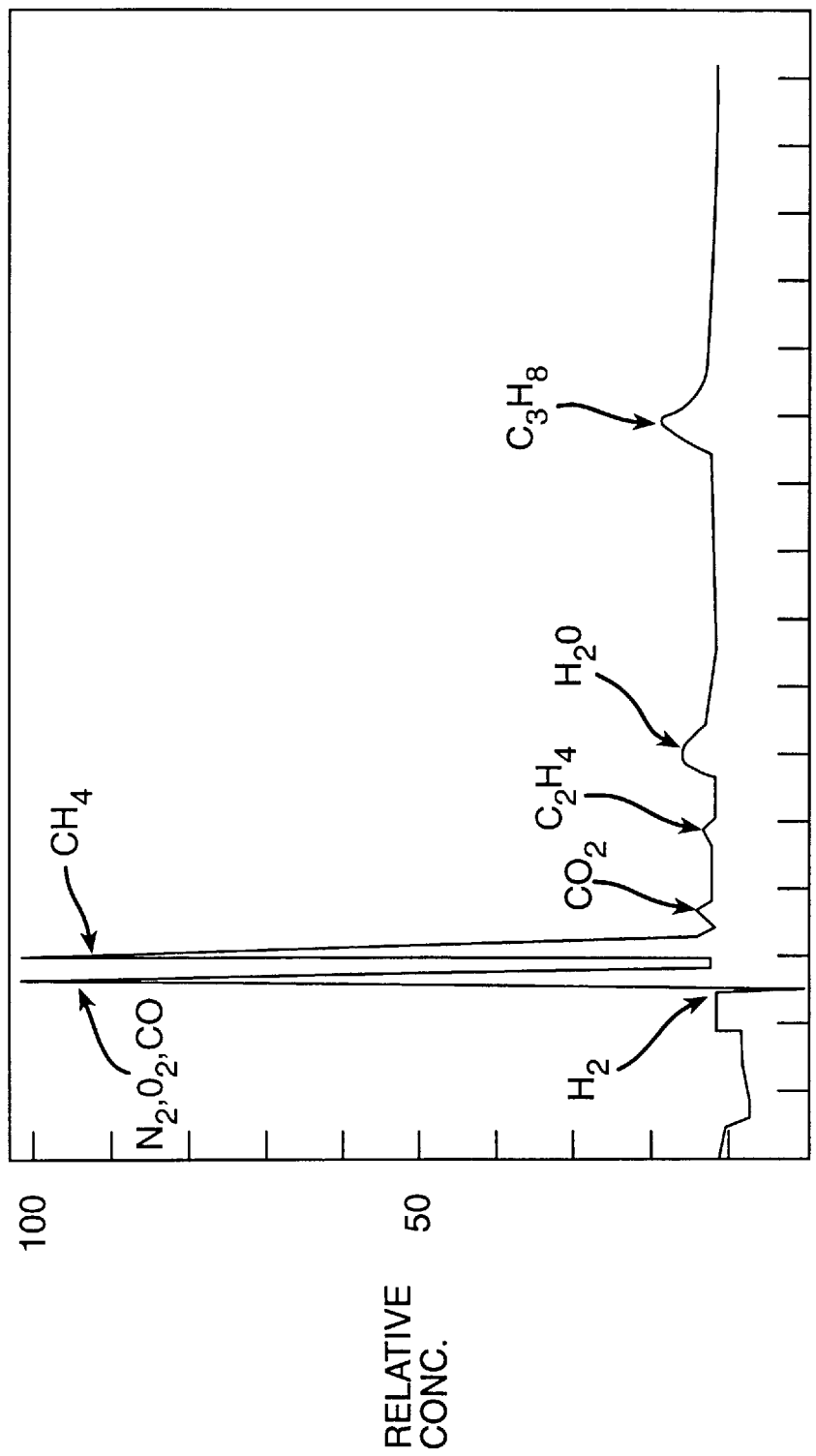

METHOD OF PRODUCING VAPOR GROWN CARBON FIBERS USING COAL

BACKGROUND OF THE INVENTION

The present invention relates to the production of vapor grown carbon fibers and, more particularly, to a cost effective method of producing vapor grown carbon fibers which utilizes coal having a high sulfur content as a source of an iron catalyst, as a source of hydrocarbon and sulfur, or both.

In recent years, the demand has increased for carbon fibers which can be used as reinforcements in composites used in automotive, electronic, and aerospace applications as well as in a wide variety of consumer products. Carbon fibers possess physical properties which are beneficial in that the fibers are stronger than steel, stiffer than titanium, and yet lighter than aluminum. Most commercial carbon fibers in use today are formed from precursors of polyacrylonitrile (PAN) or petroleum pitch, and can be produced to exhibit a wide range of properties. However, such fibers are expensive to produce, and are limited in their use due to their highly anisotropic thermal conductivity.

In recent years, vapor grown carbon fibers have been developed which are highly graphitic fibers produced in a chemical vapor deposition process from the pyrolysis of a hydrocarbon gas in the presence of an iron catalyst. Typically, the fibers are produced by exposing iron particles to the hydrocarbon gas at a temperature of greater than 1000° C. to catalyze the growth of long, slender, partially graphitic filaments. Such fibers may be produced at a much lower cost than current commercial carbon fibers.

Vapor grown carbon fibers also exhibit mechanical properties which compare favorably with currently commercial carbon fibers, and have electrical and thermal properties which are significantly higher than other carbon fibers. For example, vapor grown carbon fibers may have a tensile strength as high as 7 GPa, as well as a high tensile modulus of greater than 480 GPa. Vapor grown carbon fibers may also have a room-temperature thermal conductivity in the range of about 2000 W/m-K, which is several times that of copper and aluminum. Depending upon the degree of graphitic perfection, these types of fibers may be used as reinforcements for a wide variety of composite applications.

However, current methods of forming vapor grown fibers have several disadvantages. For example, many of the iron catalysts and hydrocarbon gases used in current methods are expensive. Further, current methods typically require an amount of sulfur in the reaction in order to enhance fiber nucleation. See U.S. Pat. No. 5,374,415 to Alig et al, and U.S. Pat. No. 2,796,331 to Kauffman which teach the addition of hydrogen sulfide to enhance fiber growth. However, while the use of hydrogen sulfide has been found to significantly enhance the growth of fibers, it is expensive, highly corrosive to rubber seals and metal fittings, flammable, and extremely toxic at low levels of concentration. It would be desirable to use an alternative source of sulfur which does not suffer from the above-mentioned drawbacks.

Accordingly, there is a need in the art for a method for producing vapor grown carbon fibers which utilizes less expensive starting materials, which provides an environmentally safe, inexpensive source of sulfur, and which results in high quality vapor grown carbon fibers.

SUMMARY OF THE INVENTION

The present invention meets that need by providing a method of making vapor grown carbon fibers which utilizes coal as source of an iron catalyst, as a source of hydrocarbon and sulfur, or both. The use of coal in the method of the present invention is more cost-effective than using the expensive starting materials of other known methods, but still results in the production of high quality vapor grown carbon fibers.

Preferably, the coal used in the present invention has a sulfur content of from 1 to 6% by weight and a carbon content of from about 50–70% by weight. While coal having a high sulfur content has become undesirable in recent years for use in power plants due to emission problems, the present invention provides an alternative use for the high sulfur coal which results in the production of vapor grown carbon fibers without producing harmful emissions. In one embodiment of the invention, the coal comprises a high volatile bituminous coal.

According to one aspect of the present invention, a method of making vapor grown carbon fibers is provided comprising the steps of introducing pulverized coal, having either an iron or a sulfur content, or both, into a furnace containing a gas selected from the group consisting of hydrogen, hydrocarbon, nitrogen, ammonia, helium or mixtures thereof such that the coal becomes mixed with the gas. The coal is preferably pulverized so that it can pass through a 40 or 70 micron screen.

Preferably, the molar ratio of carbon to iron in the mixture of coal and gas when the coal has an iron and a sulfur content or iron and/or sulfur are otherwise added, is from about 600:1 to 1000:1 and the ratio of sulfur to iron is from about 0.5:1 to 12:1, and preferably from about 1:1 to 2:1.

The gas in the furnace is preferably maintained at a temperature of from about 1000° to 1175° C. until vapor grown carbon fibers are formed. The resulting fibers are then collected from the exhaust stream of the furnace.

In one embodiment of the invention, the coal is used as the source of a catalyst, where the coal preferably contains from about 0.5% to 1.5% by weight iron disulfide (pyrite) and from about 65–75% carbon. The iron and sulfur in the coal function as catalysts for fiber nucleation and growth. In this embodiment, the gas preferably comprises hydrogen gas, methane gas or a mixture thereof comprising from about 0.1 to 99.9% hydrogen gas and from about 0.1 to 99.9% methane gas.

In an alternative embodiment of the invention, the catalyst comprises iron pentacarbonyl ($Fe(CO)_5$). In this embodiment, coal is introduced into the reaction as a source of hydrocarbon and sulfur. The sulfur in the coal interacts with the iron pentacarbonyl catalyst, enhancing fiber growth and eliminating the need for hydrogen sulfide.

In both of these embodiments, the resulting exhaust stream from the furnace is essentially free of harmful sulfur dioxide.

It is also possible to combine both embodiments of the invention and use coal as an iron catalyst as well as the source of hydrocarbon and sulfur to produce vapor grown carbon fibers. The iron in the iron disulfide (pyrite) provides a basis for establishing the desired carbon/iron ratio while the sulfur from the pyrite and organic sulfur establishes the desired sulfur/iron ratio necessary to produce the vapor grown carbon fibers.

The process of the present invention produces a high yield of vapor grown carbon fibers which may find use in a number of different applications.

Accordingly, it is a feature of the present invention to provide a cost-effective method of making vapor grown carbon fibers which utilizes coal having a high sulfur content as a source of a catalyst or as a source of hydrocarbon and sulfur, or both. It is a further feature of the invention to provide a method of making vapor grown carbon fibers which is environmentally safe. These, and other features and advantages of the present invention will become apparent from the following detailed description, the accompanying drawings, and the appended claims.

BRIEF DESCRIPTION OF THE DRAWINGS

FIG. 3 is a gas chromatograph plot illustrating that the exhaust stream is free from sulfur dioxide.

DETAILED DESCRIPTION OF THE PREFERRED EMBODIMENT

The use of coal in the process of the present invention provides a number of significant advantages over prior methods. First, the use of coal as a substitute for other more expensive starting materials such as iron pentacarbonyl, hydrocarbon, and hydrogen sulfide results in a significant decrease in production costs.

Further, the present invention provides an effective use of coal containing high percentages of both pyritic and organic sulfur which has become environmentally undesirable for use in other applications. By pyritic sulfur, we mean that the coal contains iron-sulfur compounds which are randomly distributed throughout the coal in various particle sizes. Organic sulfur is molecularly bound in the coal structure. A representative coal, such as Ohio coal, contains approximately an equal distribution of these two sulfur forms. However, the actual proportion between the two forms varies significantly within coal seams throughout the United States. It should be appreciated that the carbon, pyrite and sulfur content of the coal may vary as long as the preferred molar ratios of carbon/iron (600:1 to 1000:1) and sulfur/iron (0.5:1 to 12:1 and preferably 1:1 to 2:1) in the coal/gas mixture are maintained.

Another advantage of the present invention is that in embodiments where coal is used a source of sulfur, the sulfur from the coal becomes incorporated into the growing fibers by being adsorbed onto the catalyst and overcoated by graphite, and thus does not exit the reactor in the form of harmful sulfur dioxide, which could develop into acid rain.

In addition, because the growth process is essentially a pyrolytic process conducted at a temperature of around 1000° C., the absence of or low level of oxygen leads to a lack of carbon, nitrogen and sulfur oxides in the exhaust. Consequently, emissions from the process are exhausted as methane and similar hydrocarbons that produce a clean fuel for recycling purposes or for use in power generation without the negative impacts associated with acid rain.

Figure 1:
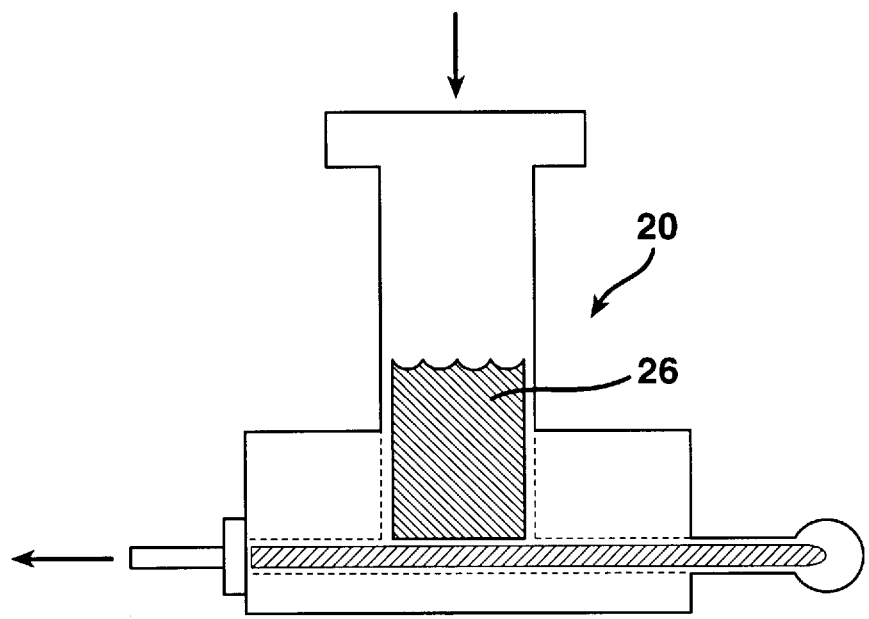
FIGS. 1 and 2 are schematic representations of the apparatus used to produce vapor grown carbon fibers in accordance with the present invention.
Figure 2:
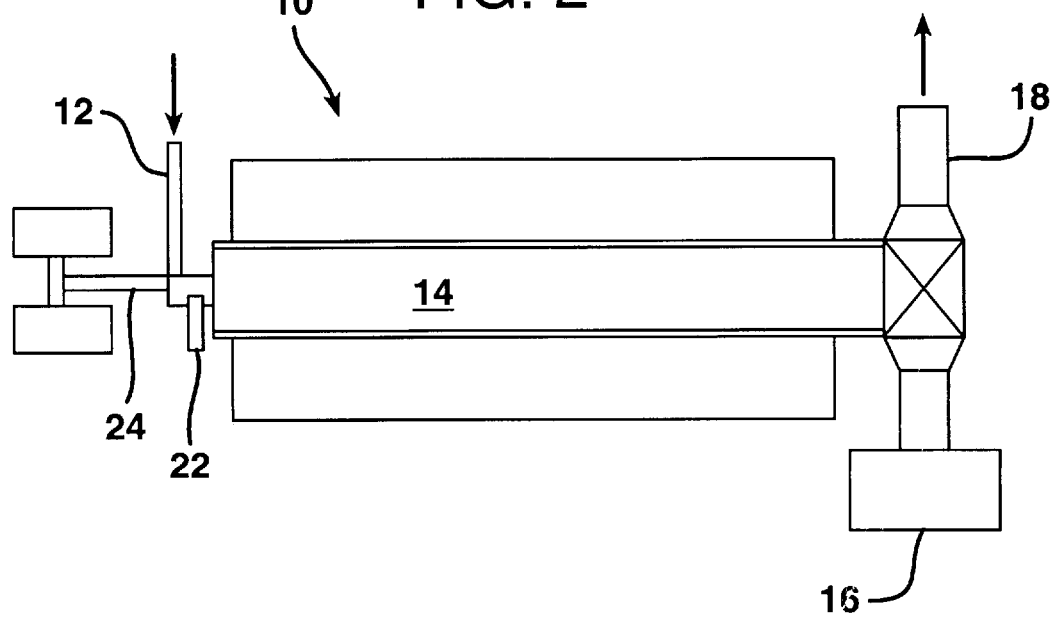

FIGS. 1 and 2 illustrate the apparatus used to make the vapor grown carbon fibers utilizing coal. In the embodiment in which coal is used as the source of a catalyst, the coal is pulverized so that it will pass through a 40 or 70 micron screen and then injected into a reactor furnace 14 through tube 12 and carried by means of the gas mixture which is introduced into tube 24. The coal is preferably pulverized to the smallest size economically practical as a finer grind allows the mixture to disperse in a more random manner, enhances the yield, and allows the subsequent ash products to be more easily removed. The coal should also be free of moisture.

The coal preferably contains about 1% by weight iron disulfide with a 70% total carbon content. A preferred source of coal is high volatile B bituminous coal, such as Ohio #8 coal, from Consol, Inc., Ohio Upper Freeport seam coal, or Ohio Clarion 4A seam coal. We have found that coal contains various amounts of naturally occurring iron disulfide (pyrite), and thus can be used as a replacement for expensive catalysts such as iron pentacarbonyl. The free sulfur content in the coal is preferably from 0 to 50% of the total sulfur content (pyrite plus organic sulfur), and may vary depending on the desired end use. The free sulfur in the coal also eliminates the need to use hydrogen sulfide as an enhancement to the catalyst.

After the catalyst (coal) has been injected into tube 24, a gas mixture comprising from 0.1 to 99.9% hydrogen and from 0.1 to 99.9% methane is introduced to the furnace through tube 24 which carries the pulverized coal into the furnace and which initiates fiber nucleation and growth. The hydrogen/methane mixture is preferred for use as such gases may be recycled. However, other gases such as ethane, nitrogen, and ammonia may also be used.

While ammonia has been shown to be beneficial for carbon formation, it should be appreciated that the use of coal in the present invention minimizes the need for ammonia as coal generally contains nitrogen constituents in the range of 1 to 2% by weight. The presence of nitrogen compounds in coal is desirable as it enhances the fiber growth. In addition, some nitrogen groups remain on the surface of the resulting fiber, providing improved bonding with polymeric matrices when the fibers are later formed into composite products.

Liquid hydrocarbons or hazardous waste benzene also provide carbon and may be used in place of the gas mixture as long as they are capable of carrying the pulverized coal into the reactor furnace.

The furnace is preferably maintained at a temperature of between about 1100°–1150° C. until fibers are formed. The resulting fibers are then collected from the exhaust stream of the furnace through collection tank 16.

In the embodiment where coal is utilized as a source of hydrocarbon and sulfur, the coal 26 is preferably pulverized to pass through a 40 or 70 micron screen and added to a mechanical screw feeder 20 shown in FIG. 1. The screw feeder 20 is connected to the furnace at connector 12, and allows precise amounts of coal to be added to the furnace at a constant rate. A carrier gas is then introduced to transport the pulverized coal from the screw feeder to the furnace. In this embodiment, the furnace preferably contains a gas mixture of 0.1 to 15% hydrogen, and 0.1 to 2% helium, and 0.1 to 80% natural gas. The carrier gas flow rate should be such that there is no settling and should allow the gas to be carried into the reactor at in a random turbulent state. A preferred settling rate for 63 micron coal is about 0.7 ft./sec. and a preferred linear flow rate is 75 ft./sec.

The iron pentacarbonyl catalyst is preferably added at port 22. The catalyst, gas mixture and coal are then carried through tube 24 into the furnace 14 and heated to a temperature of preferably between 1100°–1150° C. until fibers are formed. The resulting fibers are collected in collection tank 16. The exhaust stream from the furnace then exits through exhaust 18, and is essentially free of sulfur dioxide as illustrated in the gas chromatograph plot shown in FIG. 3.

The coal used as a hydrocarbon and sulfur source should contain about 1% by weight organic sulfur and from 0 to 50% pyrite as the remaining total sulfur content. As stated above, the coal and gas mixture should be balanced so that the molar sulfur/iron ratio is preferably about 1:1 to 2:1. We have found that the presence of sulfur enhances the production of carbon fibers by liquifying the iron catalyst, enhancing filament nucleation. However, care should be taken not to add coal containing excessive amounts of sulfur beyond about a 9:1 sulfur/iron ratio as this will cause fiber production to increase while the quality of the fibers decreases. In addition, it has been found that excess sulfur beyond about a 12:1 sulfur/iron ratio in the gas phase rapidly poisons the growing filaments, making them relatively short. At higher ratios, fiber growth eventually ceases.

Preferred coal for use as the hydrocarbon and sulfur source in the present invention is high-volatility B group bituminous coal (Ohio). Other coals may be used which exhibit better carbon content and grindability; however, the B group bituminous coal is preferred because of its high sulfur content.

Preferably, the coal used in the present invention is refined to a low or no ash content before use. However, it should be appreciated that some applications may tolerate the presence of ash in the product.

Ash is a well-known byproduct of coal, and is present in high volatile bituminous coal in ranges of between 7 to 17% on a dry weight basis. We have found that the presence of ash does not preclude the use of coal as a hydrocarbon source as the ash does not become imbedded in the graphitic fiber structure during growth. If imbedded in the fiber structure, coal would no longer be feasible for use as an alternative hydrocarbon source without a prior extraction and filtration procedure. However, if ash is extracted from the coal as a free-standing constituent, it could be used as a non-black filler commonly used in rubber formulations or as a filler in cement with the fiber acting as a reinforcement. For applications where high electrical and thermal conductivity are desired, the ash may be filtered and separated from the fiber during subsequent densification, treatment, and/or sizing processes.

In order to maintain the reaction temperature and prevent fiber and ash build-up on the reactor wall during production, a tangential burner (not shown) may be added to the reactor furnace as taught in U.S. Pat. No. 2,375,796, incorporated herein by reference. Such a burner introduces a balanced mixture of air and hydrocarbon which allows nearly complete combustion tangential to the inside surface of the furnace. A tangential tube may be angled into the reactor furnace which creates a high velocity flame that travels in a helical fashion along the wall of the furnace. This creates a barrier and prevents deposits and growth of carbon fiber on the wall of the reactor furnace.

In embodiments where the coal is used both as a source of a catalyst and a source of hydrocarbon and sulfur, an iron sulfide containing coal (pulverized) is injected into reactor furnace 10 through tube 12.

Because the fibers produced from the method of the present invention may be produced at a much lower cost than prior methods, the resulting fibers may be used in a number of different applications, including reinforcements in cement, in composites for automobiles, such as in sheet molding compounds, and in electronic and aerospace components.

In order that the invention may be more readily understood, reference is made to the following examples, which are intended to be illustrative of the invention, but are not intended to be limiting in scope.

EXAMPLE 1

Vapor grown fibers were prepared using the iron and sulfur content of coal as the source of a catalyst for fiber growth and nucleation. The coal used in Trial 1 was Ohio #8 coal containing 2.25% pyrite, 2.4% organic sulfur, and approximately 60% total carbon. 10% pulverized iron sulfide was also added to the coal for Trial 1. Trials 2 through 7 utilized Ohio Upper Freeport Seam coal containing 1.4% pyrite, 1.1% organic sulfur, and 65% carbon. Trials 8 and 9 utilized Ohio Clarion 4A Seam coal containing 1.5% pyrite, 1.7% organic sulfur, and 63% carbon. Prior to use, the coal was pulverized and separated through a 325 mesh screen (under 44 microns).

The process utilized various mixtures of hydrogen, methane and ammonia gases. The flow of gases and coal into the furnace is shown below in Table I.

TABLE I

| Trial | Hydrogen flow (cc/min) | Methane flow (cc/min) | Ammonia flow (cc/min) | Coal flow (gram/min) |
|---|---|---|---|---|
| 1 | 0 | 4900 | 1180 | 0.35 |
| 2 | 4000 | 0 | 0 | 0.2 |
| 3 | 6000 | 0 | 0 | 0.6 |
| 4 | 4000 | 0 | 2000 | 0.6 |
| 5 | 6000 | 0 | 0 | 0.6 |
| 6 | 4000 | 2000 | 0 | 0.6 |
| 7 | 6000 | 0 | 0 | 0.73 |
| 8 | 0 | 5100 | 1050 | 0.4 |
| 9 | 0 | 1700 | 350 | 0.4 |

Vapor grown carbon fibers were formed and tested by X-ray diffraction to reveal that the fibers were graphitized at about the same level as commercial ex-PAN type carbon fiber.

EXAMPLE 2

A reactor used in vapor grown carbon fiber production was converted to enable the use of coal as a hydrocarbon feedstock. The reactor normally uses a feedstock mixture of 99.9% pure methane gas, where high purity helium is bubbled through liquid iron pentacarbonyl to provide iron catalyst particles, and 99.3% pure hydrogen sulfide gas is simultaneously injected into the 1150° F. reactor. A typical daily control formulation that would produce a 25% yield is shown below as the control group.

A screw type feeder driven by a variable speed motor was used to feed the coal in gram quantities to the reactor zone. A methane and ammonia carrier gas was used to transport the coal dust from the screw feeder to the reactor hot zone. For the first trial, Ohio #8 coal from CONSOL, Inc., containing 4.71% total sulfur and about 60% total carbon was pulverized and separated to less than $63\mu$ through a 230 mesh screen.

For trial 2, hydrogen was used as the carrier gas. The coal was obtained through Kaiser Engineers from the Upper Freeport Seam having 2.5% total sulfur content and an estimated 65% carbon content. The coal was pulverized and separated through a 200 mesh screen. The gas mixtures used and the amount of sulfur used in each trial is shown below in Table II.

TABLE II

| | Methane | Coal | Sulfur | Hydrogen | Ammonia | Helium | Fe(CO)$_5$ |
|---|---|---|---|---|---|---|---|
| Control | 79.36 | 0 | 0.39 | 0 | 18.1 | 0.78 | 1.37 |
| Trial 1 | 71.64 | 7.64 | 0.37 | 0 | 18.19 | 0.79 | 1.37 |
| Trial 2 | 0 | 80.68 | 2.02 | 13.30 | 0 | 1.45 | 2.55 |

*Amounts are in percent by weight

In the control formulation, vapor grown carbon fiber was produced with a yield of 25% with a 2% standard deviation.

To estimate the degree of graphitization, a sample from Trial 1 was examined by X-ray diffraction. It was found that the samples had a D-spacing between graphene planes in a range typical of a low modulus commercial fiber.

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A method of making vapor grown carbon fibers comprising the steps of:

introducing pulverized coal containing from about 0.5% to 2.25% by weight iron disulfide into a reactor furnace containing a gas selected from the group consisting of hydrogen, methane or a mixture thereof comprising from about 0.1 to 99.9% hydrogen gas and from about 0.1 to 99.95 methane gas, such that said coal becomes mixed with said gas and establishes a molar ratio of carbon to iron in said mixture of from about 600:1 to 1000:1 and a molar ratio of sulfur to iron in said mixture of from about 0.5:1 to 12:1; wherein said coal functions as a catalyst for fiber nucleation and growth;

maintaining said gas at a sufficient temperature to form vapor grown carbon fibers; and collecting said fibers from the exhaust stream of said furnace.

2. The method of claim 1 wherein said temperature is from about 1000° C. to 1175° C.

3. The method of claim 1 wherein said coal has a sulfur content of from 1 to 6% by weight.

4. The method of claim 1 wherein said coal comprises high volatile bituminous coal.

5. The method of claim 1 wherein the molar ratio of sulfur to iron in said mixture of coal and gas is about 1:1 to 2:1.

6. The method of claim 1 wherein said exhaust stream from said furnace is essentially free of sulfur dioxide.

7. The method of claim 1 wherein said coal has been pulverized such that it can be passed through a 70 micron screen.

8. The method of claim 1 wherein said coal has been pulverized such that it can be passed through a 40 micron screen.

9. A method of making vapor grown carbon fibers comprising the steps of:

introducing pulverized coal into a reactor furnace containing a gas selected from the group consisting of hydrogen, hydrocarbon, nitrogen, ammonia, helium or mixtures thereof such that said coal becomes mixed with said gas, wherein said coal is a source of hydrocarbon and sulfur;

adding a catalyst comprising iron pentacarbonyl for fiber nucleation and growth to establish a molar ratio of carbon to iron in said mixture of from about 600:1 to 1000:1 and a molar ratio of sulfur to iron in said mixture of from about 0.5:1 to 12:1;

maintaining said gas at a sufficient temperature to form vapor grown carbon fibers; and collecting said fibers from the exhaust stream of said furnace.

10. The method of claim 9 wherein said coal contains from about 0.5 to 1.5% organic sulfur.

11. The method of claim 9 wherein said gas comprises methane, ammonia, helium, or mixtures thereof.

12. The method of claim 9 wherein said exhaust stream from said furnace is essentially free of sulfur dioxide.

13. The method of claim 9 wherein said coal has been pulverized such that it can be passed through a 70 micron screen.

14. The method of claim 9 wherein said coal has been pulverized such that it can be passed through a 40 micron screen.

15. A method of making vapor grown carbon fibers comprising the steps of:

introducing pulverized coal into a reactor furnace containing a gas selected from the group consisting of hydrogen, hydrocarbon, nitrogen, ammonia, helium or mixtures thereof such that said coal becomes mixed with said gas, said reactor furnace including a tangential burner connected thereto to prevent fiber and ash build-up on the walls of said furnace during formation of said fibers;

adding other ingredients necessary to establish a molar ratio of carbon to iron in said mixture of from about 600:1 to 1000:1 and a molar ratio of sulfur to iron in said mixture of from about 0.5:1 to 12:1;

maintaining said gas at a sufficient temperature to form vapor grown carbon fibers; and collecting said fibers from the exhaust stream of said furnace.

* * * * *